United States Patent
Tanaka et al.

(10) Patent No.: US 10,850,269 B2
(45) Date of Patent: Dec. 1, 2020

(54) EXHAUST GAS PURIFICATION CATALYST

(71) Applicants: Atsushi Tanaka, Toyota (JP); Takeru Yoshida, Miyoshi (JP); Naoto Miyoshi, Nagoya (JP); Akemi Sato, Toyota (JP); Yasutaka Nomura, Kakegawa (JP); Satoru Inoda, Kakegawa (JP)

(72) Inventors: Atsushi Tanaka, Toyota (JP); Takeru Yoshida, Miyoshi (JP); Naoto Miyoshi, Nagoya (JP); Akemi Sato, Toyota (JP); Yasutaka Nomura, Kakegawa (JP); Satoru Inoda, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 0 days.

(21) Appl. No.: 16/213,324

(22) Filed: Dec. 7, 2018

(65) Prior Publication Data

US 2019/0201884 A1 Jul. 4, 2019

(30) Foreign Application Priority Data

Dec. 28, 2017 (JP) ................. 2017-253768

(51) Int. Cl.
*B01J 23/38* (2006.01)
*B01J 23/40* (2006.01)
(Continued)

(52) U.S. Cl.
CPC .......... *B01J 35/04* (2013.01); *B01D 46/2429* (2013.01); *B01D 53/945* (2013.01); *B01J 23/10* (2013.01); *B01J 23/42* (2013.01); *B01J 23/464* (2013.01); *B01J 35/0006* (2013.01); *B01D 2046/2437* (2013.01); *B01D 2255/1023* (2013.01); *B01D 2255/1025* (2013.01);
(Continued)

(58) Field of Classification Search
CPC ... B01J 23/38; B01J 23/40; B01J 23/42; B01J 23/44; B01J 23/46; B01J 35/0006; B01J 35/04
See application file for complete search history.

(56) References Cited

U.S. PATENT DOCUMENTS 7,722,829 B2 * 5/2010 Punke ................. B01D 53/944
422/180
8,293,182 B2 * 10/2012 Boorse ............... B01D 53/9468
422/180

(Continued)

FOREIGN PATENT DOCUMENTS

JP 2010-138770 A 6/2010
JP 2017-140602 A 8/2017

*Primary Examiner* — Cam N. Nguyen
(74) *Attorney, Agent, or Firm* — Dickinon Wright PLLC

(57) ABSTRACT

The exemplary embodiments relate to an exhaust gas purification catalyst, in which exhaust gas purification performance is secured and an increase in pressure loss is suppressed, which is an exhaust gas purification catalyst, in which a porous filter wall of a substrate having a wall-flow structure is coated with a catalyst material containing an OSC material having oxygen storage capacity and a catalyst metal, wherein the density of percolation paths having percolation path diameters of 4 μm or more per unit area inside of the filter wall coated with the catalyst material is 100 paths/mm² to 1000 paths/mm².

3 Claims, 6 Drawing Sheets

(51) Int. Cl.
*B01J 23/42* (2006.01)
*B01J 23/44* (2006.01)
*B01J 23/46* (2006.01)
*B01J 35/00* (2006.01)
*B01J 35/04* (2006.01)
*B01D 46/24* (2006.01)
*B01D 53/94* (2006.01)
*B01J 23/10* (2006.01)

(52) U.S. Cl.
CPC .............. *B01D 2255/908* (2013.01); *B01D 2255/9155* (2013.01); *B01D 2255/9205* (2013.01)

(56) References Cited

U.S. PATENT DOCUMENTS

| | | | | |
|---|---|---|---|---|
| 9,333,490 B2* | 5/2016 | Kazi | ........................ | B01J 23/44 |
| 9,581,063 B2* | 2/2017 | Klingmann | .............. | B01J 23/40 |
| 2019/0105636 A1* | 4/2019 | Wang | ........................ | F01N 3/20 |

* cited by examiner

EXHAUST GAS PURIFICATION CATALYST

CROSS REFERENCE TO RELATED APPLICATIONS

The present application claims priority from Japanese patent application JP 2017-253768 filed on Dec. 28, 2017, the content of which is hereby incorporated by reference into this application.

BACKGROUND

Technical Field

Exemplary embodiments relate to an exhaust gas purification catalyst and more specifically an exhaust gas purification filter catalyst.

Background Art

An exhaust gas discharged from an internal combustion engine of an automobile or the like contains particulate matter (PM) mainly composed of carbon which causes air pollution, and this particulate matter is passed through a filter so as to be trapped and removed from the exhaust gas. Filters having a wall-flow structure are widely used as such filters. Diesel particulate filters (DPFs) for diesel engines, gasoline particulate filters (GPFs) for gasoline engines that emit a certain amount of particulate matter together with exhaust gas although the amount is less than that of diesel engines, and the like have been developed.

For example, JP Patent Publication (Kokai) No. 2010-138770 A discloses a ceramic filter used for exhaust gas purification in an internal combustion engine. This ceramic filter has: an external wall; porous partition walls arranged in a honeycomb shape inside the external wall; and a plurality of cells partitioned by the porous partition walls, which at least partially penetrate through each partition wall from one end face to the other end face thereof. When tomographic planes are obtained by tomography of the partition walls of the ceramic filter by X-ray CT scanning, fine pores are present over a plurality of the tomographic planes and penetrate through from one end face to the other end face of each partition wall. When the fine pores are designated as percolation paths and the total number of percolation paths is calculated by determining and summing the number of percolation paths on each tomographic plane, the number of percolation paths per unit volume is not less than $7.5 \times 10^4$ paths/mm$^3$.

Here, harmful components such as carbon monoxide (CO), hydrocarbon (HC), and nitrogen oxide (NOx) are contained in exhaust gas in addition to particulate matter. The harmful components can be removed from exhaust gas by coating a filter with a catalyst such as a noble metal catalyst. The filter described in JP Patent Publication (Kokai) No. 2010-138770 A is not coated with such catalyst. When the filter is coated with a catalyst to improve exhaust gas purification performance, the gas flow path in a partition wall is blocked or the inner diameter thereof becomes small, which causes gas permeability of the partition wall to deteriorate and then results in increased pressure loss.

In addition, JP Patent Publication (Kokai) No. 2017-140602 A discloses a method for producing a filter catalyst, comprising: coating a filter substrate composed of a ceramic porous body with slurry containing a powder having an average particle size of 0.8 μm or less for forming a catalyst coating layer such that the coating amount per liter of the filter substrate is adjusted to 60 to 140 g and the filter catalyst has an average opening ratio of not less than a value calculated by the following formula: −0.12x+22.90 (x is the coating amount (g/L of the filter substrate)).

JP Patent Publication (Kokai) No. 2017-140602 A teaches that the pressure loss increase is suppressed by adjusting the average opening ratio of a filter wall of the substrate to be not less than a certain value calculated from the formula. However, since the average opening ratio of the filter wall is determined based on the shape of its surface, when the exhaust gas flow path inside the filter wall is blocked or the inner diameter of the filter wall is small even at the same level of the average opening ratio, gas permeability decreases. Therefore, improvement was still needed from the viewpoint of suppressing the pressure loss increase.

SUMMARY

As stated above, improvement was still needed for conventional filter catalysts coated with catalysts in order to suppress the pressure loss increase which leads to a decrease in the output while securing exhaust gas purification performance. Therefore, the exemplary embodiments relate to an exhaust gas purification catalyst in which exhaust gas purification performance is secured and an increase in pressure loss is suppressed.

For example, it is possible to suppress an increase in pressure loss while securing exhaust gas purification performance by adjusting the density of percolation paths having percolation path diameters of 4 μm or more inside a filter wall coated with a catalyst material within a certain range. The exemplary embodiments are shown below.

For example, the exemplary embodiments are as follows.
(1) An exhaust gas purification catalyst, in which a porous filter wall of a substrate having a wall-flow structure is coated with a catalyst material containing an OSC material having oxygen storage capacity and a catalyst metal, wherein
when the density of percolation paths having percolation path diameters of 4 μm or more per unit area inside of the filter wall coated with the catalyst material is determined by constructing a three-dimensional model based on three-dimensional shape data obtained by measurement of the filter wall coated with the catalyst material by X-ray CT, extracting a trajectory of a sphere of the maximum diameter that can pass without physically interfering with the filter wall so as to minimize the distance, repeating route search without overlapping of trajectories, and calculating the density of percolation paths having percolation path diameters of 4 μm or more per unit area, the determined density is 100 paths/mm$^2$ to 1000 paths/mm$^2$.
(2) The exhaust gas purification catalyst according to (1), wherein the coating amount of the catalyst material is 30 g/L to 200 g/L with respect to the volume of the substrate.

According to the exemplary embodiments, an exhaust gas purification catalyst, in which exhaust gas purification performance is secured and an increase in pressure loss is suppressed, can be provided.

DETAILED DESCRIPTION

The detailed embodiments are described below.

The exhaust gas purification catalyst of the exemplary embodiments is a filter catalyst obtained by coating a filter substrate with a catalyst material, which is disposed in an exhaust passage of an internal combustion engine so as to purify exhaust gas discharged from the internal combustion engine. More specifically, according to the exhaust gas purification catalyst of the exemplary embodiments, a porous filter wall of a substrate having a wall-flow structure is coated with a catalyst material containing an OSC material having oxygen storage capacity and a catalyst metal. The wall-flow structure has a honeycomb structure having a plurality of cells extending in the axial direction from one end face to the other end face thereof and filter walls (also referred to as "partition walls") partitioning the cells, in which cells of a honeycomb structural body are alternately plugged at one end or the other end thereof to form end-plugged portions. In the exhaust gas purification catalyst of the exemplary embodiments, a filter wall is porous and has many fine pores inside thereof, and the surface of a fine pore is coated with a catalyst material.

Figure 1:
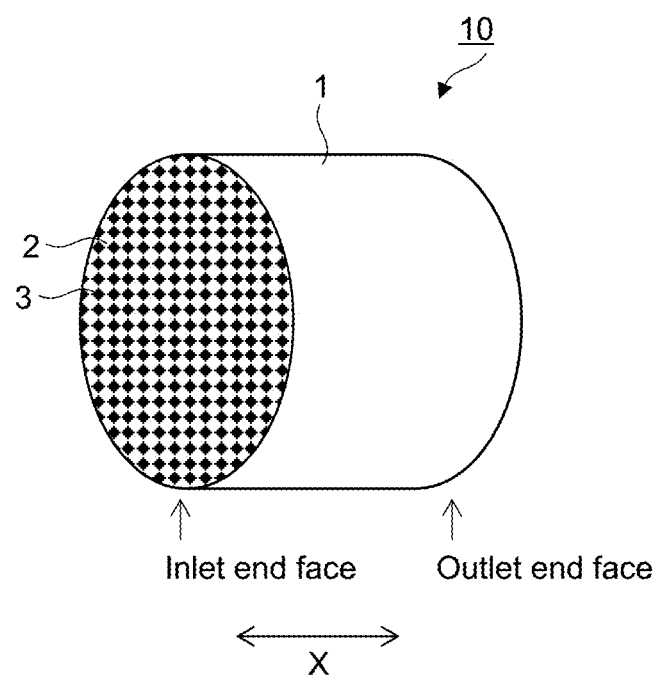
FIG. 1 is a perspective view schematically showing one embodiment of the exhaust gas purification catalyst of the exemplary embodiments.
Figure 2:
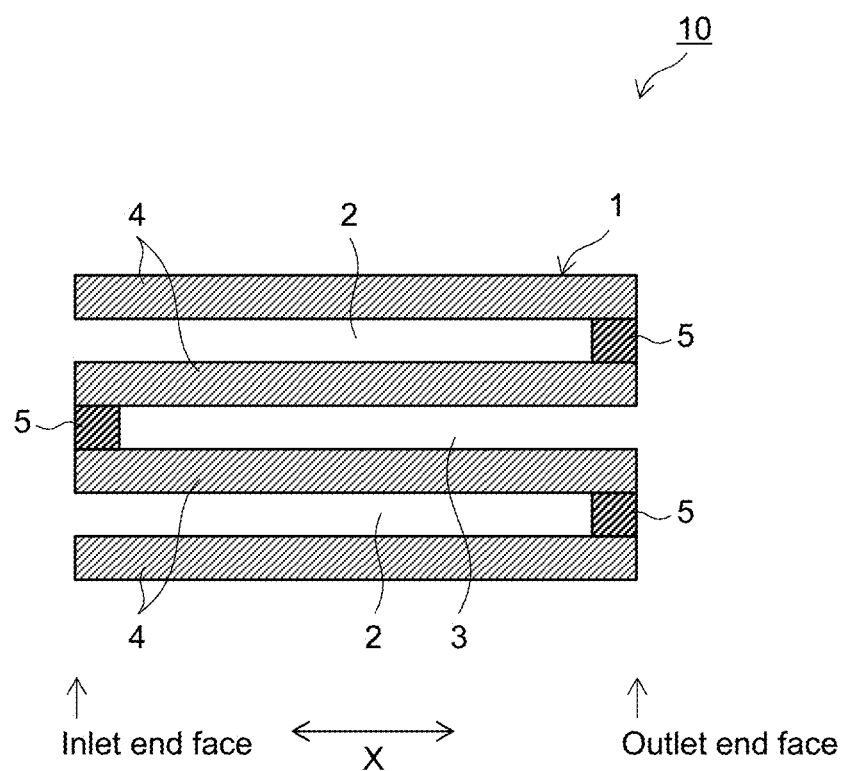
FIG. 2 is a schematic view of an enlarged part of a cross-section in the axial direction of one embodiment of the exhaust gas purification catalyst of the exemplary embodiments.

FIGS. 1 and 2 illustrate one embodiment for carrying out the exhaust gas purification catalyst of the exemplary embodiments. FIG. 1 is a perspective view schematically illustrating an exhaust gas purification catalyst 10. FIG. 2 is a schematic diagram of an enlarged part of a cross-section of the exhaust gas purification catalyst 10 cut in the X axis direction. In the exhaust gas purification catalyst 10, a substrate 1 has an inlet side cell 2 which has an open end on the inlet end face side and an end plugged with a plugged portion 5 on the outlet end face side, an outlet side cell 3 which is adjacent to the inlet side cell 2, has an open end on the outlet end face side, and is plugged with a plugged portion 5 on the inlet end face side, and a porous filter wall 4 which partitions between the inlet side cell 2 and the outlet side cell 3. The surface of each fine pore inside of the filter wall 4 is coated with a catalyst material (not shown). Exhaust gas passes through the filter wall 4 from one surface to the other surface thereof in the exhaust gas purification catalyst 10.

A material of the substrate is, for example, cordierite, aluminum titanate, SiC, Si-bonded SiC, or mullite, and in some embodiments, cordierite is used from the viewpoint of cost.

From the viewpoints of suppressing pressure loss and securing sufficient strength, the filter wall of the substrate before coating with the catalyst material has a porosity of usually 40% to 80% and 50% to 70% in some embodiments.

The average fine pore size of the filter wall of the substrate before coating with the catalyst material is usually 5 μm to 40 μm and 15 μm to 25 μm in some embodiments from the viewpoint of particulate matter collection performance.

In the exhaust gas purification catalyst of the exemplary embodiments, the filter wall of the substrate is coated with the catalyst material. In other words, in the exhaust gas purification catalyst of the exemplary embodiments, a catalyst coating layer is formed inside of the filter wall of the substrate. One catalyst coating layer or two or more catalyst coating layers may be formed. One layer or two layers are formed in some embodiments. Note that a catalyst coating layer as a whole does not necessarily have a uniform structure, and it may have, for example, a single layer structure or a dual layer structure in a specific area in the axial direction.

The catalyst material contains an OSC material having oxygen storage capacity and a catalyst metal.

As the catalyst metal, it is possible to use conventionally known catalyst noble metals for exhaust gas purification catalysts. For example, noble metals such as platinum (Pt), palladium (Pd), rhodium (Rh), ruthenium (Ru), iridium (Ir), and osmium (Os) are used in some embodiments, and palladium (Pd) and rhodium (Rh) are used in further embodiments. Only one kind of catalyst metal may be used. However, a combination of two or more catalyst metals is used in some embodiments. Such combination of catalyst metals is a combination of Pd and Rh in some embodiments. Here, catalyst metals are separately contained in different layers in some embodiments.

A catalyst metal is supported on a carrier in some embodiments. A carrier for supporting a catalyst metal is not particularly limited. Examples thereof include an aluminum oxide (alumina: $Al_2O_3$), a zirconia oxide ($ZrO_2$), a silicon oxide (silica: $SiO_2$), and composite oxides containing these oxides as the main components. The carrier is an aluminum oxide in some embodiments.

The OSC material is an inorganic material having oxygen storage capacity (OSC), and it occludes oxygen when a lean exhaust gas is supplied and releases oxygen occluded when a rich exhaust gas is supplied, thereby making it possible to enhance exhaust gas purification performance against the fluctuation of the oxygen concentration in exhaust gas. Examples of the OSC material include a cerium oxide (ceria: $CeO_2$) and a composite oxide containing ceria (for example, a ceria-zirconia composite oxide (CZ or ZC composite oxide)). Among such OSC materials, a ceria-zirconia composite oxide is used in some embodiments because it has high oxygen storage capacity and is relatively less expensive. An OSC material is used in a state of not supporting a catalyst metal in some embodiments.

According to the exhaust gas purification catalyst of the exemplary embodiments, the density of percolation paths having percolation path diameters of 4 μm or more per unit area inside of the filter wall which is obtained by measurement of the filter wall by X-ray CT (corresponding to the number of percolation paths having percolation path diameters of 4 μm or more per unit area, also hereinafter referred to as the "percolation path density") is 100 paths/mm$^2$ to 1000 paths/mm$^2$, 200 paths/mm$^2$ to 1000 paths/mm$^2$ in some embodiments, and 500 paths/mm$^2$ to 1000 paths/mm$^2$ in further embodiments. When the density of thick percolation paths having percolation path diameters of 4 μm or more inside of the filter wall is 100 paths/mm$^2$ or more, the exhaust gas purification catalyst of the exemplary embodiments can achieve significantly high exhaust gas purification performance and OSC performance while securing a sufficiently low level of pressure loss. Meanwhile, the density of percolation paths having percolation path diameters of 4 μm or more is 1000 paths/mm$^2$ or less, the exhaust gas purification catalyst of the exemplary embodiments can achieve a significantly low level of pressure loss while securing sufficiently high exhaust gas purification performance and OSC performance. Therefore, when the density of percolation paths having percolation path diameters of 4 μm or more inside of the filter wall is adjusted to 100 paths/mm$^2$ to 1000 paths/mm$^2$, it allows the exhaust gas purification catalyst of the exemplary embodiments to suppress an increase in pressure loss while securing exhaust gas purification performance and particle collection performance. Note that the density of percolation paths having percolation path diameters of 4 μm or more inside of the filter wall before coating with the catalyst material is usually 1500 paths/mm$^2$ to 2500 paths/mm$^2$. However, since coating with the catalyst material causes the percolation paths inside of the filter wall to be blocked or have decreased inner diameters, the density of percolation paths having percolation path diameters of 4 μm or more decreases after coating with the catalyst material.

In the exemplary embodiments, the term "percolation path" refers to a fine pore penetrating through the filter wall in a direction perpendicular to the axial direction, which means a penetrating pore that extends from one surface to the other surface of the filter wall. The shape of a percolation path is not particularly limited. For example, a percolation path may penetrate through the filter wall without having branching points therein. Alternatively, it may have branching points inside of the filter wall and form two or more openings on one surface or both surfaces of the filter wall.

According to the exemplary embodiments, the density of percolation paths having percolation path diameters of 4 μm or more inside of the filter wall can be determined by constructing a three-dimensional model based on three-dimensional shape data obtained by measurement of the filter wall coated with the catalyst material by X-ray CT, extracting a trajectory of a sphere of the maximum diameter that can pass without physically interfering with the filter wall so as to minimize the distance, repeating route search without overlapping of trajectories, and calculating the number of percolation paths having percolation path diameters of 4 μm or more per unit area.

Figure 3:
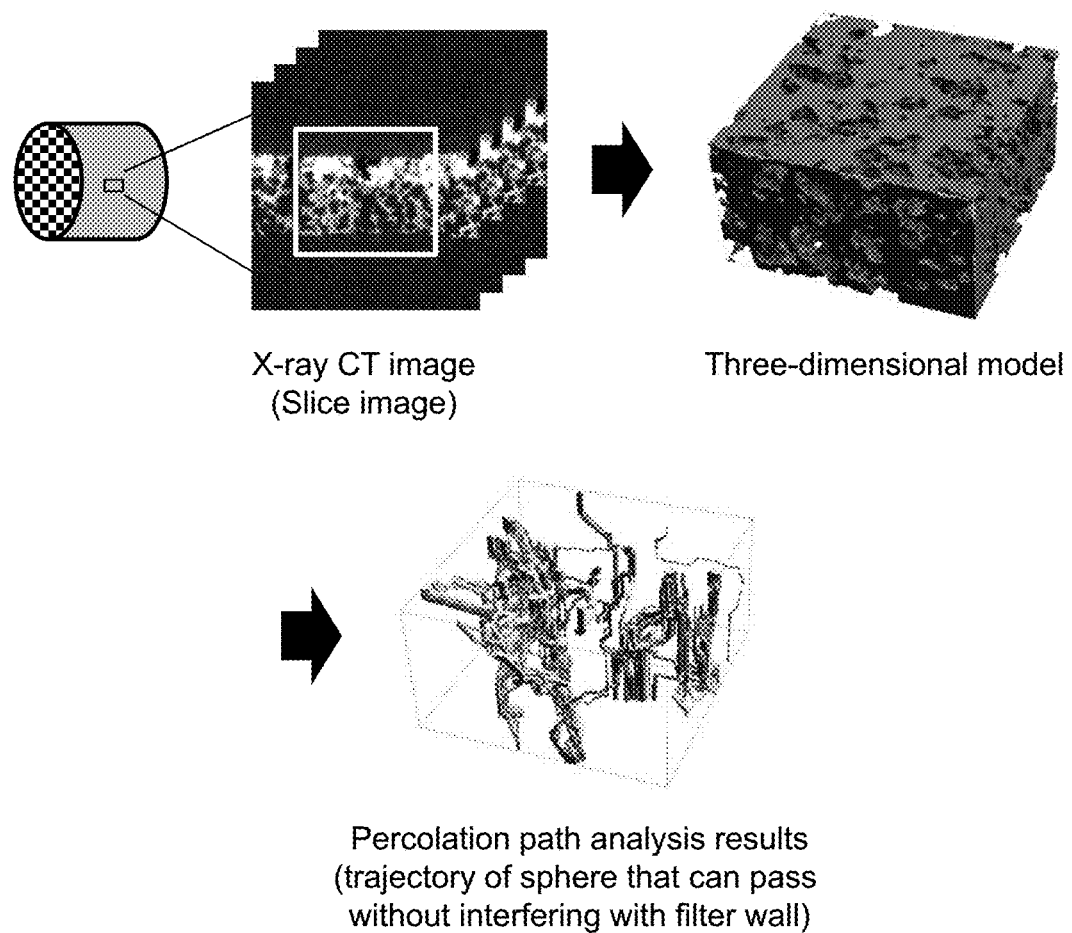
FIG. 3 is a schematic view showing the outline of a method for measuring the percolation path density.
Figure 4:
FIG. 4 is one example of a slice image obtained by binarization in one embodiment of the exhaust gas purification catalyst of the exemplary embodiments.

FIG. 3 illustrates a method for determining the percolation path density. As illustrated in FIG. 3, first, a measurement sample obtained by sampling a filter wall at an arbitrary position (for example, at the center in the axial direction) of an exhaust gas purification catalyst is measured by X-ray CT to obtain a slice image. A measurement sample has a size of, for example, 5 mm×5 mm×5 mm. FIG. 4 illustrates an example of a slice image subjected to binarization processing. In FIG. 4, the black portion corresponds to a catalyst material and a substrate, and the white portion corresponds to a void. X-ray CT is performed at a resolution of, for example, 0.5 μm to 2 μm/pixel.

Subsequently, a three-dimensional model is constructed from the slice image (three-dimensional shape data) obtained by X-ray CT measurement of the measurement sample. Here, the constructed three-dimensional model corresponds to a range extending from one surface to the other surface of the filter wall. Next, the density of percolation paths having percolation path diameters of 4 μm or more in the constructed three-dimensional model is obtained. The percolation path density can be determined by extracting a trajectory of a sphere (true sphere) of the maximum diameter that can pass without physically interfering with the filter wall so as to minimize the distance, repeating route search without overlapping of trajectories with the use of, for example, the PoloDict-PercolationPath function of software "GeoDict" manufactured by Math2Market GmbH, and calculating the number of percolation paths having percolation path diameters of 4 μm or more per unit area. Here, a trajectory of a sphere of the maximum diameter that can pass without physically interfering with the filter wall is used in the measurement method of the exemplary embodiments. Thus, the percolation path diameter corresponds to the diameter of the sphere of the maximum diameter. In addition, when the percolation path diameter is 4 μm or more, it means that an area of a transverse section of a percolation path having the smallest diameter has a diameter of 4 μm or more. According to the measurement method of the exemplary embodiments, trajectories of a sphere are extracted. In most cases, the shape of a transverse section of a percolation path is not a perfect circle but, for example, an elliptical shape. Therefore, even when there is apparently only one path penetrating through the filter wall, if there are other paths through which a sphere can pass without physically interfering with the filter wall (provided that trajectories thereof do not overlap or intersect), the number of percolation paths is counted as two or more.

The coating amount of the catalyst material on the filter wall is 30 g/L to 200 g/L per substrate volume in some embodiments and 45 g/L to 100 g/L per substrate volume in further embodiments. When the coating amount is 30 g/L or more, the level of pressure loss significantly decreases while sufficient exhaust gas purification performance and oxygen storage capacity are secured, and when it is 200 g/L or less, sufficient exhaust gas purification performance and oxygen storage capacity are significantly improved while a sufficiently low level of pressure loss is secured.

The exhaust gas purification catalyst of the exemplary embodiments can be produced by, for example, coating a filter wall of a substrate with slurry of a catalyst material containing an OSC material having oxygen storage capacity and a catalyst metal and then drying and baking the coated filter wall. In other words, a method for producing the exhaust gas purification catalyst of the exemplary embodiments comprises: a step of coating a filter wall of a substrate with slurry of a catalyst material containing an OSC material having oxygen storage capacity and a catalyst metal, thereby obtaining an exhaust gas purification catalyst in which the filter wall is coated with the catalyst material; and a step of drying and baking the exhaust gas purification catalyst in which the filter wall is coated with the catalyst material.

Slurry of the catalyst material can be obtained by dispersing a catalyst metal which is supported by a carrier, if necessary, and an OSC material in a solvent such as water. A catalyst metal, a carrier, and an OSC material are used in the powder form in some embodiments. As slurry of a catalyst material, one kind of slurry or two kinds of slurry containing different catalyst metals may be used depending on the number of catalyst metals to be used. However, two kinds of slurry for forming a first catalyst coating layer and a second catalyst coating layer are used in some embodiments. In some embodiments, a first slurry for forming a first catalyst coating layer containing rhodium (Rh) optionally supported on a carrier and an OSC material and a second slurry for forming a second catalyst coating layer containing palladium (Pd) optionally supported on a carrier and an OSC material are used as slurry. In one embodiment, a first slurry for forming a first catalyst coating layer containing Rh optionally supported on an aluminum oxide and a CZ composite oxide and a second slurry for forming a second catalyst coating layer containing Pd optionally supported on an aluminum oxide and a CZ composite oxide are used as slurry. A catalyst metal may be preliminarily supported on a carrier powder. Alternatively, a catalyst material is coated, dried, and baked, and then, a catalyst metal may be supported on the thus formed catalyst coating layer by a conventionally known method such as a method for supporting a catalyst metal by water absorption or adsorption.

The average particle size of a powder in slurry of a catalyst material is from 0.1 μm to 20 μm in some embodiments and from 0.5 μm to 7 μm in further embodiments. According to the exemplary embodiments, the average particle size is the value of 50% cumulative particle size measured by laser diffraction scattering (D50 diameter). The particle size of a powder in slurry can be adjusted by, for example, mixing slurry components and a solvent (e.g., water) and treating the mixture by grinding (e.g., wet grinding).

Coating of the filter wall with slurry can be carried out by, for example, applying slurry to the filter wall for coating (coating by suction of slurry under reduced pressure or spray coating by air blowing). For example, it is possible to conduct wash coating by filling inlet side cells with slurry and then suctioning slurry from outlet side cells.

The filter wall of the substrate is coated with slurry of the catalyst material at a predetermined coating width (coating width (%) in the axial direction with respect to the whole length of the filter wall). In some embodiments, when a first catalyst slurry and a second catalyst slurry are used, for example, a first catalyst slurry is used for coating with a coating width of 50% to 100% from the inlet side and of 65% to 100% from the inlet side in further embodiments, and a second catalyst slurry is used for coating with a coating width of 50% to 100% from the outlet side and of 65% to 100% from the outlet side in further embodiment.

Subsequently, the exhaust gas purification catalyst in which the filter wall is coated with the catalyst material is dried and baked.

The method for producing the exhaust gas purification catalyst of the exemplary embodiments further comprises a step of measuring the percolation path density for the filter wall coated with the catalyst material and determining an exhaust gas purification catalyst for which the density of percolation paths having percolation path diameters of 4 μm or more per unit area is 100 paths/mm$^2$ to 1000 paths/mm$^2$ to be an acceptable product. Therefore, in some embodiments, the method for producing the exhaust gas purification catalyst of the exemplary embodiments comprises: a step of coating a filter wall of a substrate with slurry of a catalyst material containing an OSC material having oxygen storage capacity and a catalyst metal, thereby obtaining an exhaust gas purification catalyst in which the filter wall is coated with the catalyst material; a step of drying and baking the exhaust gas purification catalyst in which the filter wall is coated with the catalyst material; and a step of determining the dried and baked exhaust gas purification catalyst as an acceptable product, wherein when the density of percolation paths having percolation path diameters of 4 μm or more per unit area inside of the filter wall coated with the catalyst material is determined by constructing a three-dimensional model based on three-dimensional shape data obtained by measurement of the filter wall coated with the catalyst material by X-ray CT, extracting a trajectory of a sphere of the maximum diameter that can pass without physically interfering with the filter wall so as to minimize the distance, repeating route search without overlapping of trajectories, and calculating the density of percolation paths having percolation path diameters of 4 μm or more per unit area, the determined density is 100 paths/mm$^2$ to 1000 paths/mm$^2$. Note that, as stated above regarding the exhaust gas purification catalyst, the density of percolation paths having percolation path diameters of 4 μm or more per unit area inside of the filter wall is 200 paths/mm$^2$ to 1000 paths/mm$^2$ in some embodiments and 500 paths/mm$^2$ to 1000 paths/mm$^2$ in further embodiments.

In the step of measuring the percolation path density, the density of percolation paths having percolation path diameters of 4 μm or more is measured for the filter wall coated with the catalyst material, and an exhaust gas purification catalyst for which the density is 100 paths/mm$^2$ to 1000 paths/mm$^2$ is determined to be an acceptable product. It is not necessary to measure the percolation path density for all catalysts produced herein. Some of the catalysts may be extracted at random as representative samples for measurement. It is possible to carry out measurement per production lot, for example. In other words, it is necessary to measure the percolation path density for at least one of production lots. Further, it can be regarded that catalysts produced by substantially the same production method have a similar density of percolation paths having percolation path diameters of 4 μm or more.

EXAMPLES

Exemplary embodiments are more specifically described below with reference to the Examples. However, the scope of the exemplary embodiments is not limited to the Examples.

Examples 1-7 and Comparative Examples 1-7

As a substrate, a honeycomb substrate having a cordierite wall-flow structure was used; the number of cells was 300 cpsi (cells per square inch), the volume is 1.3 L, the full length was 122 mm, the diameter was 118 mmφ, the average fine pore diameter of the filter wall was 20 μm, and the porosity of the filter wall was porosity 65%.

A rhodium (Rh) aqueous solution, an aluminum oxide (γ-Al$_2$O$_3$) powder, and pure water were mixed so that the mass ratio of Rh and γ-Al$_2$O$_3$ was 1:100, and the mixture was stirred, dried, and baked at 500° C. for 1 hour, thereby preparing an Rh-supported powder, in which Rh was supported on γ-Al$_2$O$_3$. Next, a first slurry containing the obtained Rh-supported powder and a ceria-zirconia composite oxide (CeO$_2$/ZrO$_2$=30/70) at a mass ratio of 2:3 in pure water was prepared.

A palladium (Pd) aqueous solution, an aluminum oxide (γ-Al$_2$O$_3$) powder, and pure water were mixed so that the mass ratio of Pd and γ-Al$_2$O$_3$ was 3:100, and the mixture was stirred, dried, and baked at 500° C. for 1 hour, thereby preparing a Pd-supported powder, in which Pd was supported on γ-Al$_2$O$_3$. Next, a second slurry containing the obtained Pd-supported powder and a ceria-zirconia composite oxide (CeO$_2$/ZrO$_2$=30/70) at a mass ratio of 2:3 in pure water was prepared The first slurry was supplied from the inlet side of a substrate and the second slurry was supplied from the outlet side of a substrate, thereby coating a filter wall of the substrate by wash coating so that the coating amount and the width of coating in the filter wall (coating width (%) with respect to the whole filter wall length in the axial direction) were adjusted to the coating amount (washcoat amount) and width shown in Table 1. Thereafter, drying at 150° C. for 1 hour and baking at 500° C. for 1 hour were performed. Thus, a filter catalyst was prepared. Comparative Example 7 corresponds to a substrate alone.

TABLE 1

| | Coating amount (g/L) | Width of coating in filter wall (%) | Percolation path density (paths/mm²) | Pressure loss increase rate (%) | Maximum oxygen storage capacity (Cmax) (%) |
|---|---|---|---|---|---|
| Example 1 | 45 | 70 | 251 | 7.7 | 100 |
| Example 2 | 65 | 70 | 215 | 9.2 | 115 |
| Example 3 | 65 | 70 | 158 | 10.7 | — |
| Example 4 | 70 | 70 | 206 | 8.6 | — |
| Example 5 | 65 | 100 | 992 | 1.4 | — |
| Example 6 | 70 | 100 | 494 | 2.8 | — |
| Example 7 | 100 | 100 | 204 | 10.3 | 170 |
| Comparative Example 1 | 30 | 30 | 1327 | 1.2 | 70 |
| Comparative Example 2 | 65 | 40 | 95 | 11.8 | — |
| Comparative Example 3 | 70 | 40 | 91 | 16.7 | — |
| Comparative Example 4 | 90 | 50 | 98 | 18.3 | — |
| Comparative Example 5 | 100 | 70 | 87 | 17.0 | — |
| Comparative Example 6 | 130 | 70 | 6 | 34.6 | 205 |
| Comparative Example 7 | 0 | — | 1875 | — | — |

Evaluation

The filter catalysts of Examples 1-7 and Comparative Examples 1-7 were evaluated regarding the percolation path density, pressure loss, and oxygen storage capacity. Evaluation was conducted in the manner described below.

Percolation Path Density

A portion of the filter wall at the center in the axial direction of the filter catalyst was sampled to a size of 5 mm×5 mm×5 mm and used as a measurement sample. X-ray CT measurement (Xradia 410 Versa, manufactured by ZEISS) was performed on this measurement sample, and a slice image obtained by X-ray CT measurement was used for measuring the density of percolation paths having percolation path diameters of 4 μm or more (the number of paths per unit area) by the PoloDict-PercolationPath function of software "GeoDict" manufactured by Math2Market GmbH. X-ray CT was performed at a resolution of 2 μm/pixel.

Pressure Loss

Differential pressure was measured using a pressure gauge while a room temperature atmosphere was passed through the filter catalyst at a flow rate of 7 m³/min, thereby determining pressure loss. The increase rate of pressure loss due to coating with the catalyst material was calculated as the increase rate of pressure loss after coating with respect to pressure loss before coating for the substrate.

Increase rate of pressure loss (%)=(pressure loss after coating−pressure loss before coating)/pressure loss before coating Oxygen Storage Capacity A filter catalyst was attached to a 2AR-FE engine (manufactured by Toyota Motor Corporation) and feedback control of the air-fuel ratio (A/F) was performed with an intake air amount (Ga) of 10 g/second while setting a target to 14.1 and 15.1. Based on the difference between the stoichiometric point and the A/F sensor output, oxygen excess or deficiency was calculated by the following formula, and the maximum oxygen storage capacity (Cmax) was evaluated as the oxygen storage capacity.

$$C\max(g) = 0.23 \times \Delta A/F \times \text{Amount of injected fuel}$$

Figure 5:
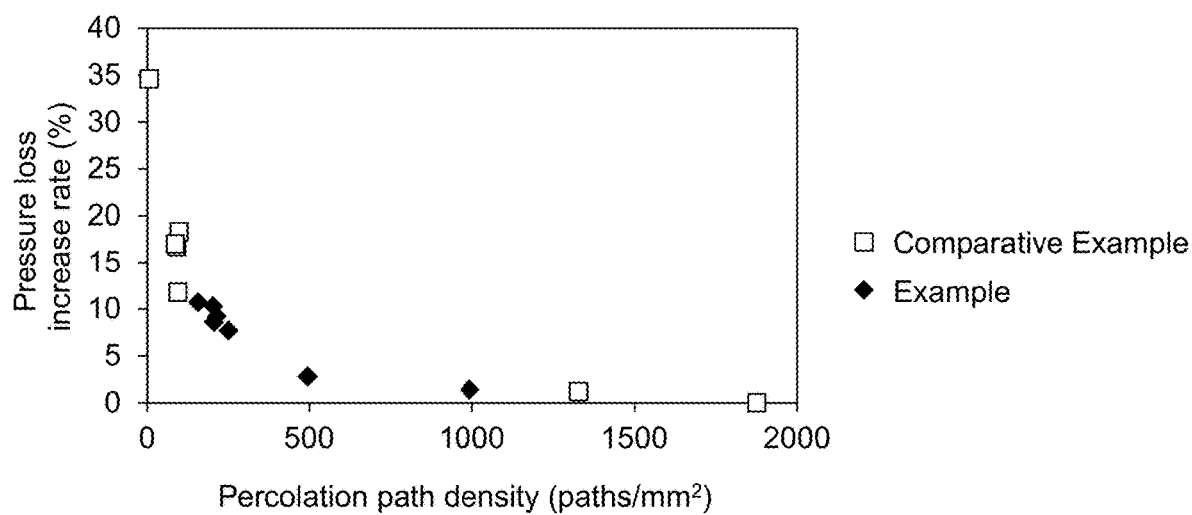
FIG. 5 is a graph showing the relationship between the density of percolation paths having percolation path diameters of 4 μm or more and the pressure loss increase rate for the filter catalysts of Examples 1-7 and Comparative Examples 1-7.
Figure 6:
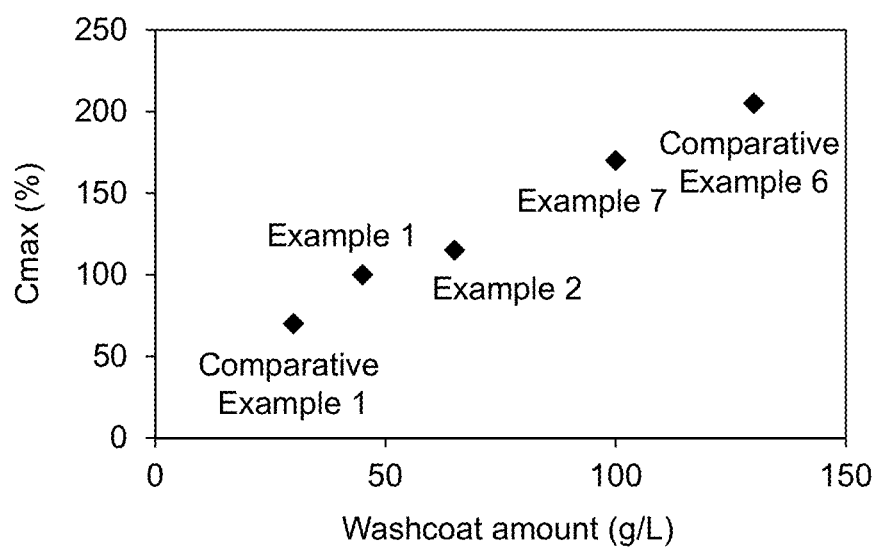
FIG. 6 is a graph showing the relationship between the washcoat amount and Cmax for the filter catalysts of Examples 1, 2, and 7, and Comparative Examples 1 and 6.

Table 1 lists the results for the filter catalysts of Examples 1-7 and Comparative Examples 1-7 regarding the density of percolation paths having percolation path diameters of 4 μm or more, the increase rate of pressure loss, and maximum oxygen storage capacity. FIG. 5 shows the relationship between the density of percolation paths having percolation path diameters of 4 μm or more and the increase rate of pressure loss for the filter catalysts of Examples 1-7 and Comparative Examples 1-7. FIG. 6 shows the relationship between the washcoat amount and Cmax for the filter catalysts of Examples 1, 2 and 7 and Comparative Examples 1 and 6. In FIG. 6, the Cmax of each filter catalyst is shown as a relative value (%) in the case of Example 1 as a reference.

Table 1 and FIG. 5 show that there was a tendency that when the density of percolation paths having percolation path diameters of 4 μm or more increased (the number of percolation paths having percolation path diameters of 4 μm or more per unit area was high), pressure loss decreased. In addition, Table 1 and FIGS. 5 and 6 show that when the density of percolation paths having percolation path diameters of 4 μm or more was below 100 paths/mm², the coating with the catalyst material caused fine pores inside of the filter wall to be blocked or have decreased inner diameters, which resulted in a sharp increase in pressure loss, while on the other hand, when the density of percolation paths having percolation path diameters of 4 μm or more exceeded 1000 paths/mm², the coating amount of the catalyst material was insufficient, although the degree of pressure loss was low, and therefore, oxygen storage capacity decreased, which resulted in reduction of exhaust gas purification performance. Accordingly, when the density of percolation paths having percolation path diameters of 4 μm or more is in a range of 100 paths/mm² to 1000 paths/mm², a favorable balance among pressure loss, exhaust gas purification performance, and oxygen storage capacity can be achieved. Table 1 and FIG. 6 show that when the coating amount of the catalyst material is 45 g/L or more, sufficiently high oxygen storage capacity can be achieved. In addition, in view of increased oxygen storage capacity and decreased pressure loss, the coating amount is preferably 45 g/L to 100 g/L.

All publications, patents, and patent applications cited herein are incorporated herein by reference in their entirety.

DESCRIPTION OF SYMBOLS

10: Exhaust gas purification catalyst
1: Substrate
2: Inlet side cell
3: Outlet side cell
4: Filter wall
5: Plugged portion

What is claimed is:

1. An exhaust gas purification catalyst, in which a porous filter wall of a substrate having a wall-flow structure is coated with a catalyst material containing an OSC material having oxygen storage capacity and a catalyst metal, wherein the catalyst metal comprises one or more metals selected from the group consisting of platinum, palladium, rhodium, ruthenium, iridium and osmium;

the OSC material is any inorganic material having oxygen storage capacity;

the exhaust gas purification catalyst is a gasoline particulate filter (GPF) catalyst;

wherein the density of percolation paths having percolation path diameters of 4 μm or more per unit area inside of the filter wall coated with the catalyst material, determined by constructing a three-dimensional model based on three-dimensional shape data obtained by measurement of the filter wall coated with the catalyst material by X-ray CT, extracting a trajectory of a sphere of the maximum diameter that can pass without physically interfering with the filter wall so as to minimize the distance, repeating route search without overlapping of trajectories, and calculating the density of percolation paths having percolation path diameters of 4 μm or more per unit area, is 100 paths/mm$^2$ to 1000 paths/mm$^2$; and wherein the coating amount of the catalyst material is 30 g/L to 200 g/L, with respect to the volume of the substrate.

2. The exhaust gas purification catalyst according to claim 1, wherein the OSC material is selected from the group consisting of cerium oxide and ceria-zirconia composite oxide.

3. The exhaust gas purification catalyst according to claim 1, wherein the catalyst metal is supported by a carrier in a powder having an average particle size of 0.1 μm to 20 μm.

* * * * *